Dec. 20, 1960  J. J. MARAFIOTI ET AL  2,964,839
FLUX FREE BONDED ARTICLE AND METHOD
Filed Dec. 14, 1954
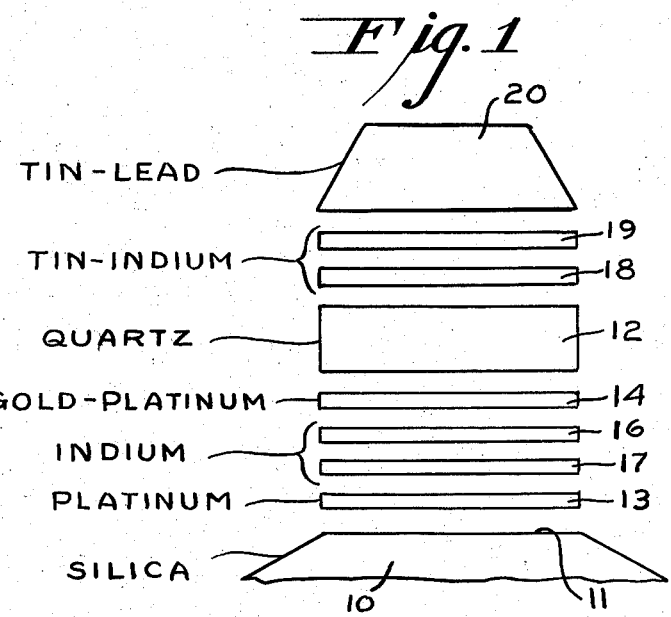
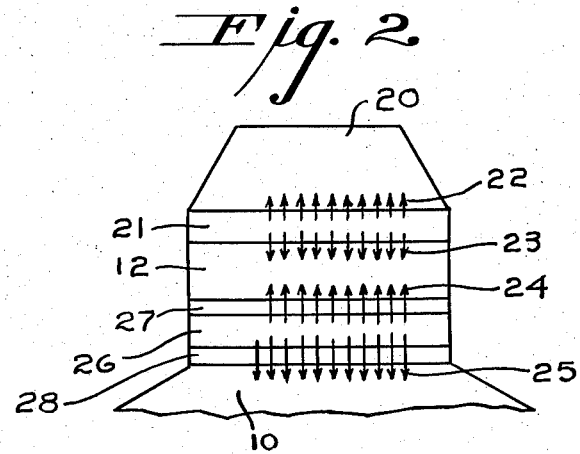
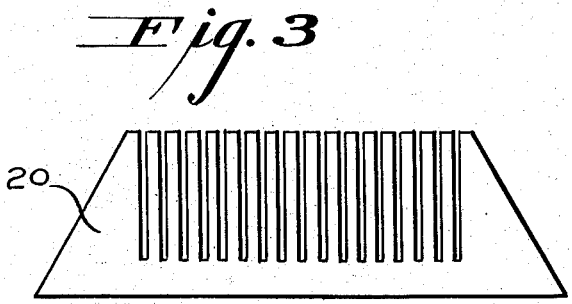
INVENTORS
JAMES J. MARAFIOTI
AND HOWARD A. SCHEETZ
BY Clarence R. Patty, J.
ATTORNEY

United States Patent Office 2,964,839
Patented Dec. 20, 1960

2,964,839

FLUX FREE BONDED ARTICLE AND METHOD

James J. Marafioti, Corning, and Howard A. Scheetz, Elmira, N.Y., assignors to Corning Glass Works, Corning, N.Y., a corporation of New York Filed Dec. 14, 1954, Ser. No. 475,062

2 Claims. (Cl. 29—195)

The present invention relates to methods of production of flux free solder bonds between like or different solid materials, such for example as glass and glass of the same or widely differing expansion coefficients, between any of a wide range of metals including aluminum, lead and copper and alloys thereof or Invar steel, or between any of such glasses and any of such metals, and to composite articles embodying such bonds.

Flux free solder bonds such as herein referred to may be defined as those effected by joining two solid materials by molten metal which diffuses into each and then is cooled below its solidification temperature. As a convenient way of describing the invention an article in the form of a solid ultrasonic delay line embodying the invention is herein shown and described.

In the accompanying drawing Fig. 1 is an exploded view, diagrammatically depicting the elements and compositions employed in such a delay line assembly.

Fig. 2 is a similar view of such delay line after assembly.

Fig. 3 is an enlarged view of an electrode of the assembly.

The particular delay line shown comprises a delay medium 10 of silica to which is bonded a quartz crystal transducer 12 which in turn has bonded thereto a tin-lead back electrode 20. The bonding materials between the silica and the quartz comprise platinum 28, indium 26, and a gold-platinum alloy 27. The bonding material between the quartz and the tin-lead back electrode comprises a tin-indium alloy 21.

As illustrated in the drawing the facet 11 of the silica element 10 has been selected as that to be mated with and bonded to crystal 12. The numerals 13 and 14 designate the platinum and gold-platinum compositions to be applied to the silica element 10 and to the quartz crystal 12 respectively. Numerals 16 and 17 designate the respective puddles of indium to be applied to the gold-platinum and platinum films to be formed on the crystal 12 and on the facet 11 of element 10 respectively. The numerals 18 and 19 designate the tin-indium mixture to be puddled onto the surface of crystal 12 and that to be used in tinning the associated tin-lead back electrode 20.

In Fig. 2 the mixtures 18 and 19 of Fig. 1 are shown as a tin-indium bond 21 wherein, as indicated by the arrows 22 and 23, the tin-indium thereof has penetrated the tin-lead electrode 20 and the crystal 12 respectively. Similarly puddles 16 and 17 of Fig. 1 are shown as an indium bond 26 part of which has penetrated the gold-platinum and platinum films 27 and 28 and the adjoining crystal 12 and the silica element 10, respectively, as indicated by the arrows 24 and 25.

Briefly, preparatory to making the bond between the silica and the quartz the mating surfaces thereof are metallized; the silica by firing in of the referred to platinum composition 13 to produce the film 28 and the crystal by firing in of the referred to gold-platinum composition 14 to produce the film 27. Each such film is then provided with a puddle of indium such as 16 and 17 and the puddles, partly cooled, are joined to one another at their top surfaces under pressure until the assembly has been further cooled to form a rigid bond between the crystal 12 and the silica element 10.

Preparatory to making the bond between the crystal 12 and the back electrode 20 they are suitably heated, the electrode mating side of the crystal provided with a puddle comprising the tin-indium mixture 18, while the electrode surface is being tinned with the similar mixture 19, after which the two surfaces are joined and the assembly allowed to cool to room temperature.

More specifically preparatory to establishing a bond between the silica element 10 and the quartz crystal 12 the surfaces to be joined to one another are thoroughly cleaned. The platinum composition 13 is brushed on the sealing surface 11 of the silica element 10, and such element subjected to a heated atmosphere at a temperature of 250° C. for one half hour. At this temperature the organic compounds evaporate and/or burn off leaving the glassy fluxes and the base metal. The element 10 is next heated for one half hour at 500° C. to burn off the binder and to start the fusion of the metallic film; and is finally subjected to a temperature of 650° C. for two hours to promote diffusion of the metallic film into the silica surface and to complete the fusion of any remaining glass fluxes.

After element 10 has cooled to room temperature it is preferably re-coated with a similar platinum composition and re-fired to produce a thicker and an assuredly electrically continuous film. The three steps of the second firing cycle are identical to those of the first, and are followed with a final step comprising a heating period of one fourth hour at 680° C. to produce a better adhesion of the second film layer to the first.

*Application of the metallic film onto the quartz crystal*

The platinum-gold composition 14 is brushed onto the surface of crystal 12 and fired in following heating of the coated crystal surface for one half hour under a radiant heat lamp to dry the tacky surface. Firing is carried out in oxidizing atmospheres in three steps. The crystal 12 is first heated for one half hour at 250° C. to burn off the organic compounds; is heated for one hour at 400° C. to minimize the possible thermal down shock on the crystal, via the air flow; and finally is heated for three hours at the highest possible temperature that can be used without exceeding the crystal transition temperature of 573° C. An atmosphere heated to approximately 500° C. has proven satisfactory to effect diffusion. At the end of the firing cycle, to prevent down shock, the supply of heat to the surrounding atmosphere is discontinued and the crystal 12 permitted to gradually cool to room temperature.

*Formation of the quartz to fused silica bond*

The crystal receiving facet 11 of the fused silica element 10 is initially heated, preferably by radiant heaters, to a surface temperature of approximately 250° C. and then swabbed with a vibrating fibre glass brush tinned with pure indium from an auxiliary molten puddle thereof, the indium being slowly spread over the facet surface. Vibrations from the brush are propagated through the thin indium film to the silica interface where they tend to release all trapped gases and to break up any foreign films of oil and layers of indium oxides. Thus, very pure indium in intimate contact with the fired-on platinum film is effected at a temperature of 250° C. Moreover, such indium diffuses completely through the platinum film, reaching the very clean fused silica within a matter of 1–10 minutes. During this period the indium is built up into a small puddle by the addition of pure indium wire and the surface skin formed on the puddle repeatedly removed therefrom over a period of time that the radiant heat is reduced to 165° C.–175° C. to provide slow cooling of the indium to a such temperature. The surface skin is preferably removed by dragging a taut strand of silica fibre over the puddle. After each latter operation indium wire is added to the puddle to maintain sufficient pure indium therein for complete diffusion into the silica and to facilitate a final skin removing operation before mating the puddle with that formed on the crystal.

Concurrently with the silica heating and swabbing operation, an identical procedure is followed with respect to the gold-platinum fired side of the crystal 12. Conveniently, the crystal is held on a suitably heated vacuum chuck for later deposit on the silica element 10.

Both molten puddles are then permitted to cool down to a stabilized temperature between 165°–175° C., a simultaneous skin removing operation of the respective puddles is carried out, the crystal 12 immediately placed on the silica puddle, and the vacuum chuck removed. The vibrating swab is then brought into contact with the floating crystal 12 and is effective to break up any possible trapped air pockets resulting from the mating procedure. Moreover, the vibration also tends to compress the indium between the parts 12 and 10 and to thus force out any excess indium and any oxides that may have gotten trapped therebetween. Finally, the crystal 12 is shifted to its exact desired position and the two parts subjected to gradually increasing pressure between press heads heated to a temperature of approximately 165° C. until the required bond pressure is reached. The actual force per square inch of crystal area varies with different frequency crystals because of opposing requirements. The optimum bonding pressure for the two more common crystals (disregarding temperature cycling stability) is:

| Crystal Frequency | Crystal Cut | Crystal Thickness, inches | Bonding Pressure, p.s.i. | Approx. bond Thickness, inches |
|---|---|---|---|---|
| 9 mc | AC Quartz | 0.0073 | 135 | 0.0001 |
| 20 mc | AC Quartz | 0.0033 | 20 | 0.0008 |

For a given frequency crystal the total bonding pressure is proportional to the crystal area. After the desired pressure has been applied the temperature of the press heads is reduced to reduce the bond temperature to 135° C. during a period of approximately ten minutes.

The foregoing cooling cycle represents a compromise between conflicting requirements, namely:

(a) Slower temperature changes result in less thermal shock and fewer cracks in the crystal; less shorting problem.

(b) Less time at or above the indium melting temperature results in less oxidation of the thin indium bond.

(c) Faster rates of change would reduce assembly time.

(d) Longer time at higher temperature could result in thinner bond.

When the press head temperature reaches 135° C., cooling thereof is discontinued and the heat input adjusted to obtain a stabilized bond temperature of 130° C. At such temperature the indium solidifies, completing the silica to quartz bond so that the assembly may be removed from between the press heads.

*Bonding of a back electrode to the crystal*

The crystal surface to be joined to the back electrode 20, composed of a tin-lead alloy, has formed thereon a puddle of molten tin-indium in a fashion similar to that formed wholly of indium on the platinum coated facet 11. The tin-indium puddle likewise also has the skin removed therefrom in a similar fashion.

In the meantime the back electrode 20 is preheated to 130° C. and is tinned by swabbing it with a molten tin-indium alloy. A puddle is not built up on such surface, however, because the tin-lead electrode 20 dissolves readily into the molten alloy with a resulting loss in shape of the electrode.

Simultaneous removal of skin from the tin-indium puddle on the crystal 12 and the similar plastic mass on the electrode 20 are effected and immediately followed by mating. After the back electrode 20 has been placed on the crystal 12, it is allowed to stabilize in temperature briefly until all of the previously melted tin-indium alloy has been remelted, after which the electrode is shifted to its final desired position with respect to the crystal 12 and the excess of molten material brushed away from the electrode. Application of heat is now discontinued and the completed assembly permitted to gradually cool to room temperature. Thermal shock is avoided since shear that occurs is between the quartz to tin-lead bond. In order to reduce the shearing forces, the back electrode 20 is preferably in the form of a comb as illustrated in Fig. 3.

In making the bond between the back side of the quartz crystal 12 and the tin-lead back electrode 20 the tin-indium alloy is also diffused into the crystal and into the electrode.

Use of an electrode of a tin-lead alloy necessitates swabbing on the tin-indium alloy at a lower temperature and accordingly diffusion is not as thorough as in the first described form of bond. Nevertheless, the tin-indium bond performs satisfactorily.

Although the flux free bonds in the foregoing described structure are between fused silica and quartz and between quartz and a tin-lead alloy, it is clearly evident from such teaching that the flux free bonding of any of such materials to any other of the described materials is also taught. Moreover, by similar methods and the employment of tin-indium alloys, flux free bonds can be made between many other metallic and/or refractory materials.

What is claimed is:

1. A delay line comprising a transmission element of fused silica and a quartz crystal transducer, and a bond between said crystal and fused silica comprising indium diffused through a gold-platinum alloy film on the crystal and indium diffused through a platinum film on the silica.

2. A method of manufacturing a delay line comprising a fused silica delay medium having a quartz crystal bonded thereto, characterized by firing onto complementary surfaces of the silica and quartz elements films comprising platinum and a gold-platinum alloy respectively, swabbing such films with molten indium while their temperatures are such that the indium diffuses into the silica and quartz elements respectively, removing any skin from the molten indium as it is permitted to lose heat, immediately after such skin removal joining such surfaces, and applying progressively increasing pressure until the indium solidifies.

References Cited in the file of this patent

UNITED STATES PATENTS

| | | |
|---|---|---|
| 2,397,400 | Barwich | Mar. 26, 1946 |
| 2,484,003 | Simison | Oct. 4, 1949 |
| 2,584,427 | Craston | Feb. 5, 1952 |
| 2,636,820 | Bolton | Apr. 28, 1953 |
| 2,664,180 | Peters | Dec. 29, 1953 |
| 2,699,847 | Nelson et al. | Jan. 18, 1955 |
| 2,709,147 | Ziegler | May 24, 1955 |
| 2,746,140 | Belser | May 22, 1956 |
| 2,754,238 | Arenberg | July 10, 1956 |
| 2,824,359 | Rhodes et al. | Feb. 25, 1958 |
| 2,859,415 | Fagen | Nov. 4, 1958 |

OTHER REFERENCES

The Review of Scientific Instruments, vol. 25, No. 2, February 1954, pp. 180–183.